United States Patent [19]
Dahle

[11] 3,750,724
[45] Aug. 7, 1973

[54] PENCIL SHARPENING MACHINE
[76] Inventor: Gerald W. Dahle, Marienberg 19, D-863 Coburg, Germany
[22] Filed: Mar. 31, 1971
[21] Appl. No.: 129,862

[30] Foreign Application Priority Data
Apr. 2, 1970  Germany.................. P 20 15 683.6

[52] U.S. Cl............................... 144/28.1, 144/28.6
[51] Int. Cl............................................. B43l 23/00
[58] Field of Search...................... 144/28.1, 28.11, 144/28.3, 28.6, 28.8, 28.9

[56] References Cited
UNITED STATES PATENTS
1,722,771   7/1929   Spengler........................... 144/28.6
3,227,140   1/1966   Brand .............................. 144/28.71

FOREIGN PATENTS OR APPLICATIONS
8,180   4/1907   Great Britain.................... 144/28.6

Primary Examiner—Andrew R. Juhasz
Assistant Examiner—James F. Coan
Attorney—Richards & Geier

[57] ABSTRACT

A pencil sharpening machine having a chuck for gripping the pencil or lead holder on the outside of the machine housing and movable in its axial direction against spring action away from the housing, and an actuating member which is mounted at least partly within the housing and which, when an outer end is depressed with one finger, is adapted to open the chuck and also to shift the same in the axial direction.

8 Claims, 6 Drawing Figures

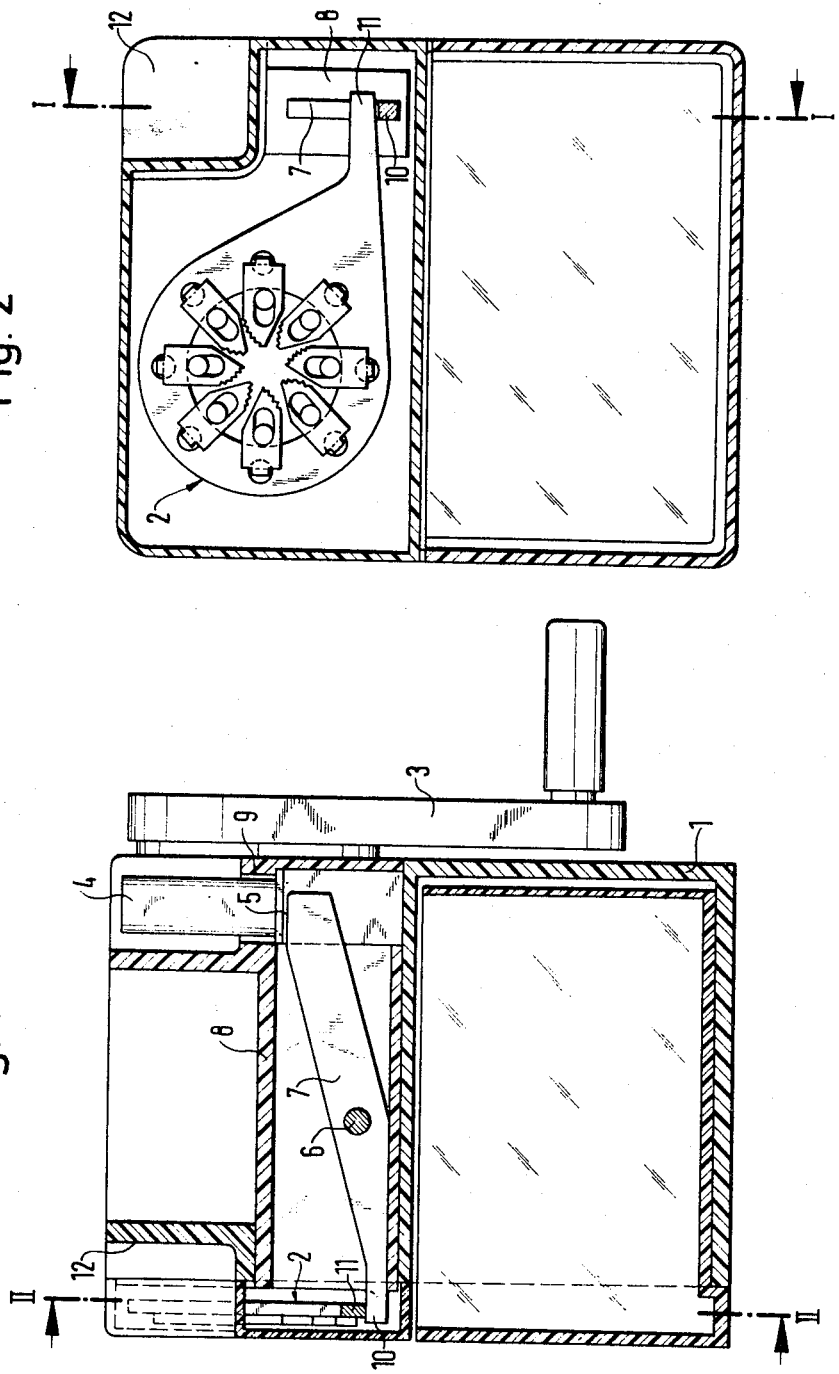

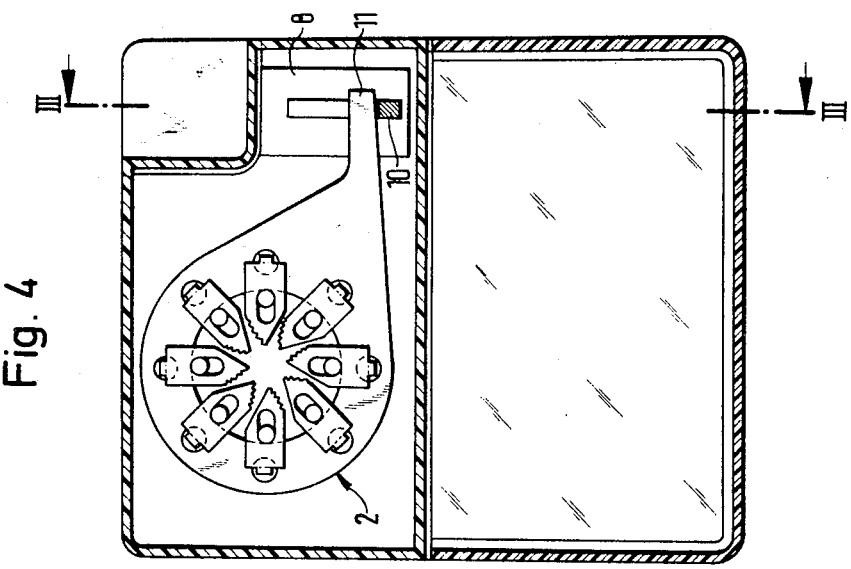
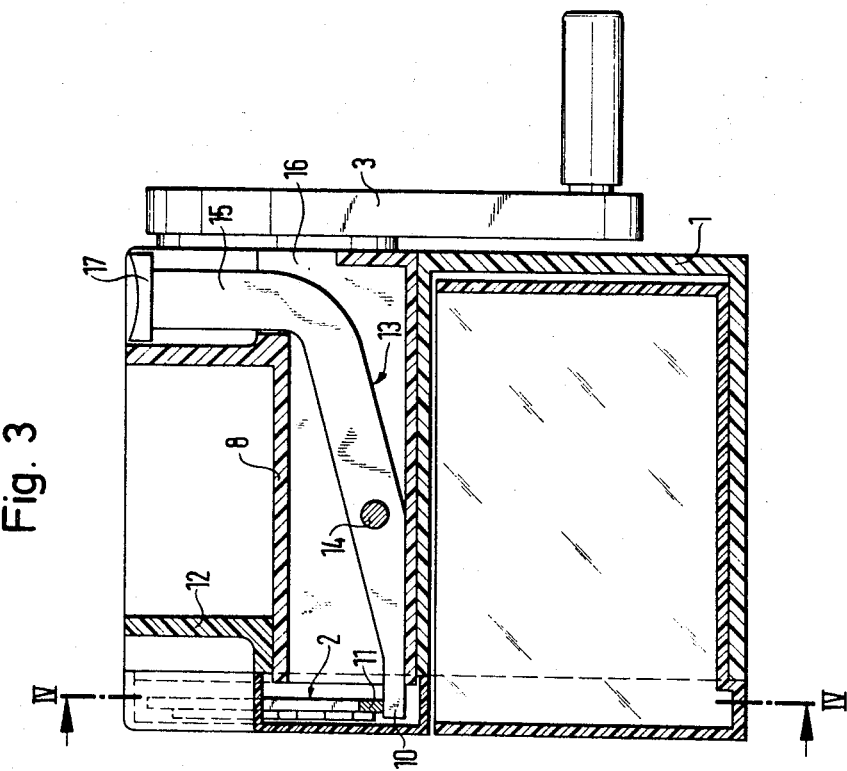

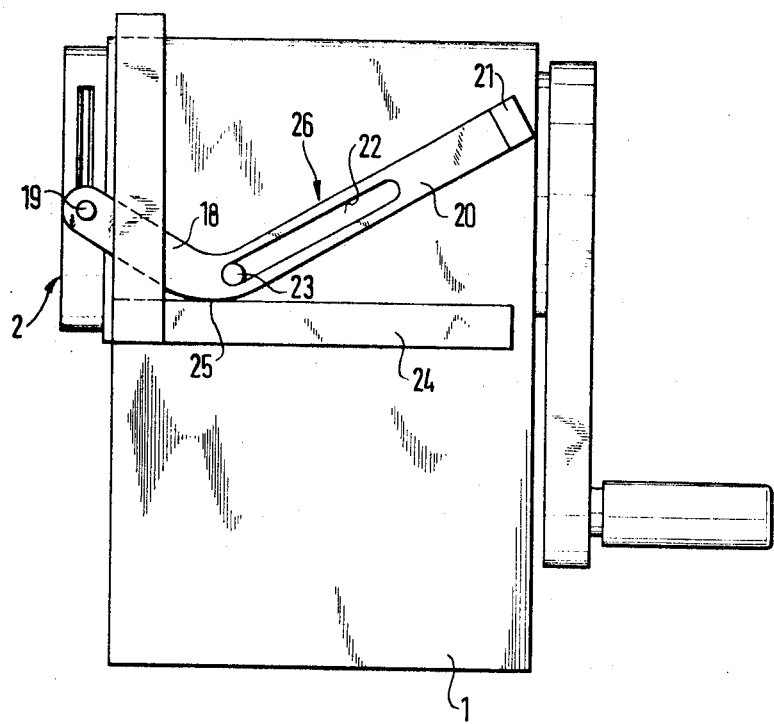

PENCIL SHARPENING MACHINE

The present invention relate to improvements in a machine for sharpening pencils, leads or the like of the general type as desclosed, for example in the German Pat. No. 958,815 and comprising a nonrotatable but axially movable chuck for gripping the pencil or lead holder, and a milling cutter which is driven by a crank and revolves about the end of the pencil or lead which is inserted into the machine.

For sharpening a pencil or a lead in a lead holder in such a machine it is necessary to carry out two movements, namely, first, to open the chuck in its casing against the action of a spring and, second, to draw the chuck with its casing against the action of a retracting spring so far out of or away from the housing of the machine as may be required for sharpening the pencil or lead.

For carrying out these movements, the chuck casing is provided with two finger arms one of which is pivotable and the other rigid with the casing. By pressing the two arms toward each other with two fingers of one hand, the pivotable arm is pivoted and the chuck is opened, and by drawing the two arms away from the machine housing against the action of the retracting spring, the chuck with its casing is drawn away accordingly and thereby exerts a force in the axial direction upon the machine housing. The housing must therefore either be tightly held with the other hand or be secured to a fixed support, for example, the surface of a table.

Not only the construction but also the manipulation of such a machine is relatively complicated since the two fingers on one hand have to cary out movements in two different direction, namely, a pivoting movement for opening the chuck and a longitudinal movement for adjusting the length of the pencil tip or lead to be sharpened.

It is an object of the present invention to provide a pencil or lead sharpening machine which is of the general type as first mentioned above but may be manipulated much more easily than a machine of a construction as last described. The principal feature of the invention for attaining this object consists in providing a single actuating element for operating the clamping jaws of the chuck and also for moving the chuck in its axial direction.

For this purpose the invention provides that the actuating element of the chuck is mounted in the machine housing and movable independently of the chuck in two directions, namely, in a substantially vertical direction for effecting the opening movement of the chuck and in a substantially axial direction for effecting the axial movement of the chuck.

For carrying out both movements, it is therefore only necessary to use one finger which during the first part of its movement exerts a downward pressure and during the second part of its movement a lateral shifting force upon the actuating element. If the housing of the machine is not secured to a fixed support, the housing may be provided with a fixed abutment to serve as a support for a second finger of the same hand for preventing the machine from being shifted in the axial direction. The actuating element may, for example, be moved by the index finger of one hand, while the machine is supported by the thumb of the same hand to remain in a fixed position.

According to one preferred embodiment of the invention, the actuating element is mounted within a slide member which is slidable in the axial direction of the chuck and is connected to and carries the latter.

Another feature of the invention consists in providing the actuating element in the form of a pushbutton which is mounted within the slide member.

More particularly, the chuck is adapted to be actuated by means of a two-armed lever which is pivotally mounted within the slide member and upon one end of which the pushbutton may act, while its other end is adapted to act upon the chuck so as to move the jaws thereof.

According to a modification of the invention, the pushbutton and the two-armed lever may be integrally combined with each other so as to form an angular lever. The pushbutton part of this lever is then pivotable about the pivot axis of the lever so that the combined pivoting movement and axial sliding movement produces a motion component for shifting the slide member and thus also the chuck in the axial direction of the latter.

A structurally very advantageous design of the sharpening machine according to the invention may be attained by mounting the actuating element within the housing near the crank of the machine.

The features and advantages of the present invention will become more clearly apparent from the following detailed description thereof which is to be read with reference to the accompanying drawings, in which FIG. 1 shows a longitudinal section of one embodiment of the invention;

FIG. 2 shows a cross section which is taken along the lines II — II OF FIG. 1;

FIGS. 3 and 4 shows views corresponding to FIGS. 1 and 2 of another embodiment of the invention; while FIG. 5 shows a diagrammatic view of a third embodiment of the invention to illustrate the functions thereof.

Figure 6:
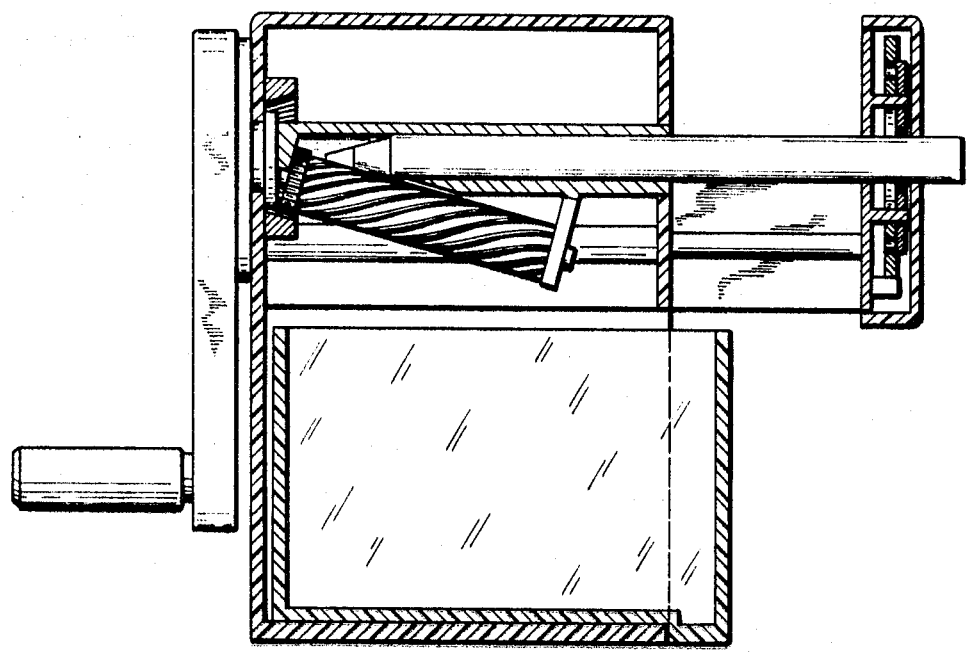
FIG. 6 is a section through the specific pencil sharpening means.

In all of the drawings, the numeral 1 indicates the housing of the sharpening machine, the numeral 2 the chuck, and the numeral 3 the crank of the machine. The internal structure of the chuck 2 as well as the milling cutter and its gear transmission may be of a conventional type. The chuck 2 must be opened by a pivoting movement against spring action to permit the pencil or lead holder to be inserted, and it must also be movable against spring action in its axial direction away from the housing 1 for adjusting the length of the pencil tip or lead to be sharpened. The present invention permits both of these operations to be carried out with one hand in the manner and by the means as subsequently described.

According to the embodiment of the invention as shown in FIGS. 1 and 2, the actuating element for the chuck 2 is an element independent of the latter and comprises a pushbutton 4 which acts upon one end 5 of a two-armed lever 7 which is pivotable about a pin 6. Pushbutton 4 and lever 7 together with its pivot pin 6 are mounted within a slide member 8 the wall of which is provided near one end with an aperture 9 in which the pushbutton 4 is slidable in a vertical direction and through which it projects to the outside. The other end 10 of lever 7 engages upon the lower side of the end of an actuating arm 11 of chuck 2 the casing of which is connected to and carried by the end of the slide member 8 opposite to the end in which the pushbutton 4 is located. The retracting spring against the action of which the slide member 8 is movable toward the left of FIG. 1 is not illustrated. The housing is further provided with a rigid abutment 12 above the slide member 8.

For operating the sharpening machine according to the invention, the pushbutton 4 is depressed with one finger, for example, the index finger, while the thumb of the same hand is placed against the outer side of the abutment 12. This abutment 12 is not required at all if the machine is rigidly secured, for example, to a table top, and if the machine is merely resting loosely on a horizontal surface, the abutment 12 is not needed during the first operation of depressing the pushbutton 4 since no force is exerted at this time through the pushbutton upon the housing 1 in the axial direction of the slide member 8. When chuck 2 has been opened by the vertical pressure, for example, of the index finger upon pushbutton 4 and the resulting pivoting movement of lever 7, the same finger moves the pushbutton 4 in the axial direction toward the left of FIG. 1 and the pushbutton thereby takes along the slide member 8 and moves the chuck 2 away from the left wall of housing 1 so as to permit the length of the pencil tip or lead to be adjusted which is to be sharpened. During this movement of slide member 8 and pushbutton 4 toward the left the operato must place his thumb against the outer side of the abutment 12 so as to prevent the machine from sliding along its horizontal supporting surface, unless it is rigidly secured to this surface.

From the above description it is evident how simple the machine may be operated. Only two fingers of one hand are required for carrying out all of the necessary adjusting movements for opening the chuck and shifting it in its axial direction, and if the machine is secured in a fixed position, these movements may even be carried out by only one finger.

FIGS. 3 and 4 illustrate a modification of the invention in which the pushbutton 4 and the lever 7 as shown in FIGS. 1 and 2 are combined into a single element in the form of an angular lever 13 which is pivotably mounted at 14 within the slide member 8. The guide surface formed by the wall of aperture 9 for the vertically movable pushbutton 4 as shown in FIG. 1 is now omitted and in place of this aperture a larger aperture 6 is provided in the upper wall and the right end wall of slide member 8. If a downward pressure is exerted by a finger upon the head 17 on the end of the normally vertical end part 15 of lever 13, the resulting movement of this part will not extend exactly in a vertical direction but form a pivoting movement of lever 13 about the pin 14. The vertical component of this pivoting movement results in a movement of the other end 10 of lever 13 which opens the chuck 2, while by means of the pivot pin 14 the horizontal component of this pivoting movement of lever 13 will be transmitted to the slide member 8 and shift the same together which chuck 2 in the axial direction of these elements.

FIG. 5 only illustrates diagrammatically the functions of a further embodiment of the invention the elements of which are shown as if they were located outside of the housing 1. The casing of chuck 2 is rigidly secured to a plate 15 on which the apex 16 of an angular lever 17 is slidable. One arm 18 of lever 17 is pivotably connected at 19 to the chuck 2, while the other arm 20 of lever 17 the free end of which forms or carries a pushbutton 21 is provided with a longitudinal guide slot 22 into which a pin 23 engages which is secured to the housing 1.

If the pushbutton 21 is depressed, lever 17 will be pivoted in the clockwise direction about the pin 23 with the result that the pivot pin 19 will move upwardly and open the chuck 2 until at the end of this movement, arm 20 will lie horizontally on plate 15. If pushbutton 21 is then shifted in the horizontal direction toward the left of FIG. 5, arm 20 will slide along plate 15 by being guided by the pin and slot connection 23, 22 so that chuck 2 which is connected by pivot pin 19 to the end of the other arm 18 of lever 17 will be shifted toward the left away from housing 1. FIG. 6 illustrates the specific device for sharpening the tip of a pencil 27. A cutter 28 is provided with curved cutting edges movable around the tip of the pencil. A sleeve 29 which receives the pencil 27 is rotatably mounted in the casing 1 and is connected at one end with the crank 3. The sleeve 29 has an opening 30 which makes possible the engagement of the pencil tip with the cutter 28. One end of the cutter is rotatably supported in a plate 31 attached to a wall of the sleeve 29. The other end of the cutter has teeth 32 engaging the teeth 33 fixed to the casing 1. When the crank 3 is rotated it will rotate the sleeve 29 around the pencil 27 which is held by the chuck 2. Thus the opening 30 of the sleeve 29 will move around the tip of the pencil. The inclined cutter 28 also participates in this rotation of the sleeve 29. However, the teeth 32 will move in engagement with the teeth 33, so that the cutter 28 will also carry out a rotary movement about its own axis. This rotation of the cutter is the actual cutting movement taking place due to the movement of the cutter about the tip of the pencil. The pencil is pushed by a spring (not shown) through the chuck 2 and against the cutter 28 until its tip is sharpened to the desired extent. This construction is substantially similar to that described in the German Pat. No. 958,815.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A machine for sharpening pencils, leads or the like comprising a housing, a chuck on the outside of said housing, adapted to be opened and closed, means for guiding said chuck in the axial direction thereof, and actuating means substantially within said housing and connected to said chuck and having a part accessible from the outside of said housing and adapted to be moved in a substantially vertical direction for opening said chuck and also in said axial direction for shifting said chuck away from said housing, a cutter in said housing and means feeding the pencil to be sharpened through said chuck to said cutter.

2. A sharpening machine as defined in claim 1, in which said actuating means comprises a slide member substantially within and guided by said housing and movable in said axial direction, and an actuating member within and connected to said slide member and having a first end projecting from said housing and adapted to be depressed and shifted in said axial direction, and having a second end connected to said chuck for opening and shifting the same.

3. A sharpening machine as defined in claim 2, in which said actuating member comprises a pushbutton guided in said slide member and projecting therefrom and adapted to be depressed into said slide member.

4. A sharpening machine as defined to claim 3, in which said chuck comprises a casing and gripping jaws within said casing, said slide member connected to said said casing, said actuating means further comprising a two-armed lever pivotably mounted in said slide member and having one end engaging with and adapted to be depressed by said pushbutton, and another end connected to said gripping jaws for opening the same.

5. A sharpening machine as defined in claim 4, in which said two-armed lever has an end part extending at an angle to the remainder of said lever and forming said pushbutton, whereby when a pressure is exerted upon said pushbutton in a certain direction said lever pivots about its axis in said slide member and exerts a vertical component and a component in said axial direction upon said lever, said vertical component that being transmitted to said gripping jaws to open the same, and said axial component being transmitted by the pivot of said lever to said slide member so as to shift said slide member and said chuck casing in said axial direction.

6. A sharpening machine as defined in claim 1, further comprising an abutment on the outside of said housing against which a finger may be placed for preventing said housing when resting loosely on a supporting surface from being shifted thereon when said actuating means are shifted in said axial direction.

7. A sharpening machine as defined in claim 1, further comprising a crank on the outside of said housing near said accessible part of said actuating means and adapted to revolve a milling cutter within said housing.

8. A sharpening machine as defined in claim 1, further comprising a plate and a pivot pin within and secured to said housing, and said actuating means comprising an angular lever having two arms, one of said arms being connected to said chuck and the other arm having a longitudinal slot and said pivot pin extending through said slot so that said lever is pivotable about said pin and slidable relative to said pin, whereby when the free end of said other arm is depressed, said lever pivots about said pin so as to open said chuck and said other arm of said lever slides along said plate so as to shift said chuck in said axial direction.

* * * * *